United States Patent Office 3,672,995
Patented June 27, 1972

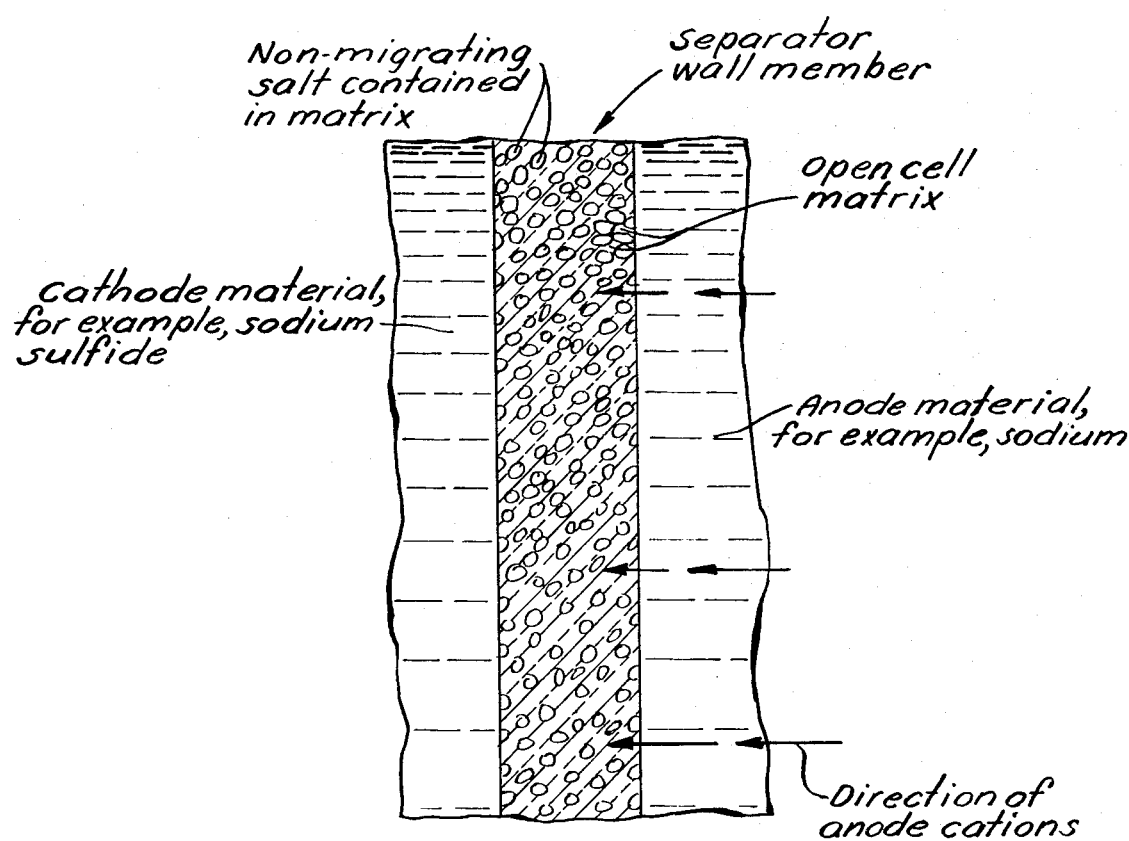

3,672,995
SOLID ELECTROLYTE FOR ELECTRICAL CELLS
William E. Brown, Walnut Creek, and Robert G. Heitz
  and Charles A. Levine, Concord, Calif., assignors to
  The Dow Chemical Company, Midland, Mich.
Continuation-in-part of application Ser. No. 567,587,
  July 25, 1966. This application May 8, 1969, Ser.
  No. 823,161
The portion of the term of the patent subsequent to
  Nov. 4, 1986, has been disclaimed
Int. Cl. H01m 3/02, 35/00
U.S. Cl. 136—6                                      5 Claims

ABSTRACT OF THE DISCLOSURE

An improved electrolyte-separator is provided for liquid anode/liquid cathode cells wherein its function is to conduct cations of the anode material without transmitting electrons. The electrolyte-separator is an impregnated glass or ceramic, open matrix wherein the discontinuous or disperse phase is an essentially non-migrating, cation-conducting salt. Such impregnated matrixes are particularly useful in batteries having molten alkali metal anodes and alkali metal sulfur mixtures for cathodes.

---

This application is a continuation-in-part of our copending application Ser. No. 567,587, filed July 25, 1966, now U.S. Pat. 3,476,602.

It is a principal object of the present invention to provide a novel secondary battery.

It is a particular object of the present invention to provide a novel composite electrolyte (separator) for the battery described in application Ser. No. 567,587, filed July 25, 1966.

These and other objects and advantages readily will become apparent from the detailed description presented hereinafter.

In general, the battery cell of the present invention comprises a liquid metal electrode as a fuel (i.e. oxidizable member), a second fluid, i.e. liquid or paste-like, electrode comprising an ion conducting mixture of ions from the metal of said first electrode dissolved with a non-aqueous anti-fuel (i.e. reducible member) and a substantially fluid tight electrolyte-membrane separating said first and second electrodes, said electrolyte-membrane being further characterized as being permeable to, i.e. transferring or otherwise passing, ions formed from the metal comprising the first electrode.

More particularly the present novel battery cell comprises a liquid anode (oxidizable member) of an alkali metal, a cathode (reducible member) comprising a non-aqueous, ion conducting liquid or fluid mixture containing in solution the alkali metal ion of the metal of the anode, and, a solid electrolyte (separator) intermediate the liquid anode and cathode materials. This separator is further characterized as transmitting ions of the anode metal between the anode and cathode compartments, but not substantially transmitting electrons, molecules of the anode metal or ions or molecular species of the cathode. The anode, cathode and electrolyte members are positioned in a liquid and vapor tight case. Electric lead assemblies connected to the anode and cathode complete the battery cell.

The present novel battery cell not only provides a high current density but also readily can be rapidly recharged without undergoing cell damage.

The battery cells can be fabricated as a complete unit comprising the electrolyte (separator) and electrodes in a liquid and vapor tight case. Conveniently the separator can be sealed in a case to provide separate anode and cathode compartments. The outer case or container, or at least the portion thereof comprising the cathode compartment, ordinarily is fabricated from an electron conducting material and is of a structural stability such that it does not degrade of detrimentally react with battery components during operation. Use of an electron conducting material provides for ready connection of cathode lead wires. Also, to assure the optimum of efficiency, the case is covered with a thermal insulating material to minimize heat losses both during cell operation and off-duty storage. Alternatively, a jacket of insulating material having heating wires or other type heating elements adjacent the case can be used to cover part of or the entire battery cell.

A preferred anode-cathode-electrolyte system of the present invention consists of a liquid sodium anode, a liquid sulfur-sodium sulfide mixture as cathode system, e.g. a sodium polysulfide, and a sodium ion conductive glass or ceramic electrolyte. This system is capable of producing energy densities of over 300 watt-hours per pound at operating temperatures as low as 330° C.

The term anode as used herein, in accordance with recognized electrochemical and electrical engineering practices denotes, when the cell is acting as a battery, i.e. delivering current to a load, the electrode at which current enters the cell. The term cathode denotes the electrode at which current leaves the cell.

Any of the alkali metals, i.e., lithium, sodium, potassium, rubidium, cesium, their amalgams, alloys and mixtures can be used as the anode. Sodium, potassium and their binary alloys ordinarily are employed. Sodium, as indicated hereinbefore, preferably is used as the anode in the present novel battery.

Cathode materials used in the present invention are non-aqueous, liquid reducible materials such as the elements sulfur, selenium, tellurium and compounds or anions such as tetracyanoethylene, para-thiocyanogen, ferricyanide and the like. Ordinarily, sulfur, selenium, tellurium and mixtures thereof are employed, sulfur being preferred. For those cathode materials which in the liquid state exhibit a high electrical resistivity, unexpectedly when an alkali metal salt is admixed therewith the requisite conductivity needed for operability when the battery is at or near full charge is provided. Usually to prepare such conductive mixtures, the salt used has a cation the same as that of the metal used for the anode and the anion is the same as that of the cathode material. Sodium sulfide dissolved in, or in admixture with, sulfur has been found to be particularly suitable for use in the practice of the present invention since these two components provide mixtures which become liquid at relatively low temperatures, e.g., at a minimum temperature of from about 270°–330° C. and which also unexpectedly exhibit high electrical conductivity over wide compositional ranges.

With the preferred sulfur-sodium sulfide catholyte system, ordinarily when used in a secondary battery and the battery cell is at full charge, the catholyte mixture of sodium sulfide and sulfur has an empirical formula corresponding to the empirical formula $Na_2S_{22}$. As current is drawn from the cell and additional sodium sulfide is formed in the cathode compartment (by virtue of the sulfur being reduced and from migration of sodium ions), this mixture composition changes. Discharge ordinarily is stopped at or before the point when the mixture corresponds to the empirical formula $Na_2S_3$ to assure operability at relatively moderately elevated temperatures. Even at this high sodium/sulfur ratio, the cathode mixture is liquid at temperatures as low as about 330° C. By stopping discharge at a catholyte composition corresponding to $Na_2S_4$, the minimum cell operating temperature can be reduced to about 285° C. However, if it is desired to operate at higher temperatures, the cell can be discharged to a catholyte composition corresponding to $Na_2S_2$ (liquid at about 560° C.), for example.

The novel liquid sodium metal-sodium polysulfide electrode system provides an exceptionally high energy density when compared with conventional anode-cathode systems. For example, if a cell having an initial sodium polysulfide composition of $Na_2S_{20}$ is discharged to a sodium sulfide-sulfur mixture corrsponding to $Na_2S_3$ the energy density realized is about 306 watt-hours per pound of combined anode and catholyte materials.

The electrical resistance of the anti-fuel materials themselves for the most part is exceptionally high. Molten sulfur, for example, has a resistivity reported to be in the range of $1 \times 10^{17}$ to $8 \times 10^{15}$ ohm-cm. Unexpectedly, with the disclosed specific liquid catholyte mixtures exceedingly low resistances are obtained. For illustrative purposes, representative conductances, expressed in reciprocal ohm-centimeters (ohm$^{-1}$ cm.$^{-1}$), of a number of liquid sodium sulfide-sulfur mixtures corresponding to various sodium polysulfide ($Na_2S_x$) compositions are presented in Table I which follows.

TABLE I

| Sodium polysulfide composition | Specific conductance, ohm$^{-1}$ cm.$^{-1}$, temperature ° C. | | | | |
| --- | --- | --- | --- | --- | --- |
| | 280 | 300 | 320 | 340 | 360 |
| $Na_2S_4$ | 6.2 | 9.0 | 11.5 | 14.4 | >16 |
| $Na_2S_5$ | 7.1 | 9.6 | 12.0 | 13.8 | 14.6 |
| $Na_2S_8$ | 3.6 | 5.3 | 7.1 | 8.8 | 10.6 |
| $Na_2S_{12}$ | 3.3 | 4.8 | 6.3 | 7.8 | 9.4 |
| $Na_2S_{22}$ | 1.9 | 2.9 | 3.8 | 4.7 | 5.5 |

Electrolytes suitable for use in the battery cell of the present invention are those inorganic and organic polymeric materials which have the ability to keep the liquid anode and cathode materials separated, which are conductive in that they must be able to transmit ions of the anode metal between the anode compartment and the cathode compartment but do not substantially conduct (1) electrons, (2) the elemental metal anode (3) or the cathode material in either its molecular and/or ionic form. Additionally, the electrolyte should not be detrimentally degraded during operation and should be highly resistant to attack by other components of the battery cell. Further, this material should possess properties which will assure many cycles of charging and discharging of the battery cell. Preferably this material has a high ionic conductivity.

Electrolytes which have been found to be particularly suitable for use in the battery cell of the present invention include, for example, polycrystalline ceramics (such as the porcelains and glass ceramics), amorphous glasses and impregnated matrixes (such as porous glass or ceramic frits) in which have been embedded an essentially non-migrating salt or liquid which is substantially permeable only to the anode metal ion.

As depicted in the accompanying drawing, in an electrolyte (separator) made of an impregnated matrix, the pores of a porous glass or ceramic material are filled with any of a variety of non-migrating salts or liquids. It is essential only that (1) the filling non-migrating salt or liquid exhibit electrical conduction by the mechanism of cation migration, utilizing the cation formed from the anode material, and (2) the pores of the matrix are in open communication, e.g., open cell foam, across the matrix. Manifestly the impregnate should either match fairly closely the expansion coefficient of the material making up the porous matrix or have sufficient plasticity so that the porous matrix retains its structural integrity upon temperature changes.

Illustratively, if the porous matrix is made of $$(2CaO) \cdot SiO_2$$

glass, open-cell foam having an expansion coefficient of $144 \times 10^{-7}$ per ° C., the pores can be impregnated with $Na_2O \cdot 2SiO_2$, which has an expansion coefficient of $143 \times 10^{-7}/°$ C. Another convenient form of impregnated matrix is provided by applying to opposite sides of an open-cell foam, molten forms of the anode and cathode materials respectively. As the two reactants penetrate the matrix, they soon encounter each other thus forming a salt at the interface. This salt may migrate somewhat within the matrix but it is essentially immobile at equilibrium conditions in the battery. In such manner, any of a wide number of porous membranes of aluminate ceramics or amorphous glasses, including sodium and/or calcium glasses, can be impregnated with salt forming ingredients of the alkali metal-sulfur batteries to form essentially non-migrating salts in situ.

As used in the battery cell, the impregnated electrolyte can be in the form of thin membranes fabricated in various orientations. These membranes can be in the form of flat plates, corrugated sheets, spirals or other designs which during operation will provide for anode metal ion transfer but will keep separate the liquid anode and cathode materials.

A preferred form for the electrolyte is fine, hollow fibers wherein the individual fibers have an outside diameter/wall thickness ratio of at least 3, ordinarily from about 3 to about 20 and preferably from about 4 to about 10. Usually within these ratios, fibers having an outside diameter from about 20 to about 1000 microns and a wall thickness of from about 5 to about 100 microns are used. Such hollow fibers provide a high strength, thin walled membrane and give a high ion conductivity. They also provide a very large surface area to volume ratio. Although less advantageous in the latter respect, fibers as large as 5000 microns outside diameter and having walls as thick as 1000 microns can be employed when fabricated from more highly ion conductive materials, e.g., certain porcelains.

For use in a battery cell, the hollow fibers can be fabricated into bundles of circular, rectangular, prismatic or other geometric cross-sectional shapes which provide for a controlled orientation and substantially uniform spacing between fibers. The actual fabrication of the electrolyte fibers into a predetermined configuration readily can be carried out by one skilled in the art using known handling, packing and fabricating techniques. To illustrate, bundles of the fibers each having one end closed can be prepared wherein the open ends of the fibers are passed through and sealed into a common header which in turn either serves as or communicates with a reservoir for anode metal.

Glass and ceramic hollow fibers or other electrolyte (separators) can be sealed in place as a bundle in a header, for example, by adhesives such as glazing or potting compounds, solder glass, high temperature thermosetting resins and the like materials.

The drawings of application Ser. No. 567,587, filed July 25, 1966, and the explanation thereof contained in the specification of said application are specifically incorporated herein by reference for further illustration of batteries according to the instant invention. In such drawings, the glass fibers (reference 10 of FIG. 1) and the sheet-like membrane electrolyte (separator) (reference 30 of FIG. 2) are constructed of porous open-cell calcium silicate glass in which the pores are filled or impregnated with a non-migrating salt such as, for example, sodium silicate, $Na_2O \cdot 2SiO_2$.

In operation of the battery cell of the present invention, as current is drawn from the battery the molten alkali metal anode gives up electrons and forms the corresponding metal ions. The electrons go through an external circuit doing work while the resultant alkali metal ions diffuse or otherwise are transported through the thin wall electrolyte separator and migrate toward the cathode. At the molten cathode, electrons are fed into the cathode chamber through the cathode lead from the external circuit forming anions with the molten cathode material, for example sulfur. These anions are, in effect, neutralized by reaction with the alkali metal ions migrating through the electrolyte (separator) thereby forming the alkali metal salt. This reaction continues through the discharge cycle of the battery.

To recharge the battery, a source of current is attached to the leads so as to feed electrons through the anode lead to the molten sodium anode and the positive lead from the power source is attached to the cathode lead of the battery. As the voltage of the power source is increased over the battery voltage, the exact reverse of the electrode reactions presented for the discharge cycle takes place. Alkali metal ions pass through the separator; alkali metal is regenerated and the reduced cathode material is oxidized to its original state. An unexpected advantage of the present system particularly when utilizing the sodium-sodium sulfide sulfur electrodes is that much more rapid recharging of the battery can be carried out without any adverse effects. In conventional lead-acid storage batteries, permanent damage occurs unless a slow "trickle" charge is applied during the recharge cycle.

Although a preferred embodiment of the present battery is the rechargeable secondary type, the liquid anode-cathode system can be employed in either cells of the primary type or the secondary (rechargeable) type With primary type cells, using a sulfur-alkali metal catholyte system, for example, at full charge the catholyte ordinarily has a higher sulfur concentration and battery operation is continued until discharged, i.e., until the power ouput falls off to such an extent that the battery does not put out enough heat to maintain the anode and cathode in the fluid state required for operability. Applications for such a cathode system primarily are in batteries used in situations requiring a low current density and/or at remote, hard to reach installations. The actual cathode composition for such cells is limited only in that the requisite conductance is present in the charged battery. This offers the advantage for such uses of a high power output from a low battery weight. It is to be understood that even in such systems, the battery can be recharged.

Additionally, it is to be understood that if the fuel, e.g., liquid metal, and anti-fuel, e.g., liquid sulfur, are added during battery operation and if the resulting reaction product controllably is removed from the catholyte chamber so as to assure both the maintenance of a high concentration of the liquid anti-fuel and conductivity of the system the battery can be used as a fuel cell. In such operation the addition of the fuel and anti-fuel and removal of the reaction product can be made on a continuous or intermittent basis.

As indicated hereinbefore, operability of the present system is based upon the use of a liquid anode and liquid cathode system. It is entirely unexpected, as set forth hereinbefore, that an alkali metal salt would provide with a non-polar anti-fuel of the type listed hereinbefore an electrically conductive melt which when employed with a liquid metal fuel provides a battery cell of high charge density. However, good conductances are achieved thereby providing for the first time the use of low equivalent weight and economic electrode materials thus providing a marked advance in the battery art.

The examples of application Ser. No. 567,587 are hereby specifically incorporated by reference to further illustrate the basic operation of the present invention. In addition, the following specific embodiments will further illustrate the use of impregnated matrixes.

EXAMPLE 1

Twenty closed end tubes of porous $2CaO \cdot SiO_2$, each 25 cm. long and having about 40 percent porosity, have their pores impregnated with $Na_2O \cdot 2SiO_2$ by immersing them in molten $Na_2O \cdot 2SiO_2$ at about 950° C. The open ends of the tubes are not immersed to avoid filling the central cores of the tubes with $Na_2O \cdot SiO_2$. The $$2CaO \cdot SiO_2$$

tubes are $1000\mu$ O.D. and $600\mu$ I.D. Formation of a continuous layer of $Na_2O \cdot 2SiO_2$ around the $(2CaO)SiO_2$ is avoided by keeping the tubes immersed until they reach the temperature of the molten $Na_2O \cdot 2SiO_2$. By impregnating at 950° C., the temperature is high relative to the melting point of the $Na_2O \cdot 2SiO_2$ so that it is highly fluid and will run off readily as the tubes are removed from the melt. Radiant heat is applied to the emerging coated tubes to keep them from cooling too rapidly. Retention of the $Na_2O \cdot 2SiO_2$ in the pores of the $$(2CaO) \cdot SiO_2$$

prior to cooling is by capillary attraction. The impregnated tubes are assembled in a parallel fashion and the open ends held in a header assembly which is then sealed to an anode cup which will act as a reservoir for the anode material. The tubes and the anode cup are then filled with molten sodium metal. A wire (the anode lead), which contacts the sodium metal in the anode cup, is brought through and sealed outside the anode cup. This assembly is immersed in a melt of $Na_2S_4$. A metal cathode lead is also immersed in the $Na_2S_4$ and one end brought out as the cathode lead from the cell. When this cell assembly is held at 300° C., an open circuit voltage of about 1.98 volts is obtained. Drawing 0.1 ampere from the cell reduces the terminal voltage to about 1.90 volts. On the charging cycle, 2.065 volts impressed across the leads produces a charging current of about 0.1 ampere.

EXAMPLE 2

Another example of a matrix membrane suitable for the preparation of an impregnated separator is a phase separated glass. An example of such glass is a silicate based glass containing approximately 40 mole percent $B_2O_3$. This glass composition is drawn into fine fibers which are held at an elevated temperature for sufficient time to allow phase separation to take place. These temperatures and times depend on the exact composition and are well-known by those skilled in the art. The phase separation gives a matrix of $SiO_2$ encompassing channels of sodium borate, i.e., the non-migrating salt. These fine fibers are assembled into bundles and the bundles assembled into battery cells as described in Example 1.

EXAMPLE 3

Another matrix separator is fabricated from porous (low fired) mullite tubes, $\frac{1}{32}''$ I.D. and $\frac{1}{16}''$ O.D. These tubes have about 20 percent porosity. A number of these tubes are assembled in parallel, one end sealed, the other ends joined in a common header, and filled with sodium metal. When the tubes are immersed in molten $Na_2S_4$, as within a battery cell assembly as described above, a solid $Na_2S$ is formed in the pores of tube walls. This solid $Na_2S$ is the electrolyte which transmits sodium ions (but not electrons) during the operation of the cell.

What is claimed is:

1. In a battery cell which comprises a first oxidizable liquid metal electrode, a second fluid electrode, said second fluid electrode comprising an ion conducting mixture of ions from said metal of said first electrode dissolved with a reducible non-aqueous cathode material, and, a substantially fluid tight, non-electron-transmitting electrolyte-membrane separating said first and second electrodes, the improvement which comprises an electrolyte-membrane characterized as being permeable to ions formed from the metal comprising the first electrode but not electron conducting, and being in the form of a glass or ceramic porous opened celled matrix having a disperse phase within the matrix consisting essentially of a non-migrating salt permeable only to the anode metal ion.

2. The battery of claim 1 wherein the impregnated matrix is a porous glass or ceramic material in which there is contained the reaction product of the anode and cathode materials as the non-migrating salt.

3. The battery of claim 1 wherein the porous matrix is a calcium oxide-silicate glass and the impregnate is a sodium oxide-silicate glass.

4. The battery of claim 1 wherein the anode comprises sodium and the cathode comprises sulfur and the porous matrix is an amorphous glass and the essentially non-migrating salt is a reaction product of sodium and sulfur.

5. The battery of claim 1 wherein the impregnated matrix is a phase separated glass.

References Cited

UNITED STATES PATENTS

| | | | |
|---|---|---|---|
| 2,081,926 | 6/1937 | Gyuris | 136—83 |
| 2,631,180 | 3/1953 | Robinson | 136—83 |
| 3,000,996 | 9/1961 | Usel | 136—9 |
| 3,031,518 | 4/1962 | Werner et al. | 136—86 |
| 3,404,035 | 10/1968 | Kummer et al. | 136—6 |
| 3,404,036 | 10/1968 | Kummer et al. | 136—6 |
| 3,476,602 | 11/1969 | Brown et al. | 136—6 |

ANTHONY SKAPARS, Primary Examiner

U.S. Cl. X.R.

136—83 R, 153